(12) United States Patent
Kashawlic et al.

(10) Patent No.: US 11,822,349 B2
(45) Date of Patent: Nov. 21, 2023

(54) AUTOMATIC FLIGHT FORMATION SYSTEMS AND METHODS

(71) Applicant: THE BOEING COMPANY, Chicago, IL (US)

(72) Inventors: Bryan Kashawlic, Chester Heights, PA (US); Bryan C.H. Chu, Chandler, AZ (US); Russell Enns, Chandler, AZ (US); Alex Salem Bourreza, West Chester, PA (US); Stephen Alexander Mohammed, Phoenix, AZ (US); Erik Bellandi, Brookhaven, PA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 17/648,563

(22) Filed: Jan. 21, 2022

(65) Prior Publication Data

US 2022/0404843 A1 Dec. 22, 2022

Related U.S. Application Data

(60) Provisional application No. 63/212,765, filed on Jun. 21, 2021.

(51) Int. Cl.
| | | |
|---|---|---|
| *G05D 1/10* | (2006.01) | |
| *G05D 1/00* | (2006.01) | |
| *B64C 39/02* | (2023.01) | |

(52) U.S. Cl.
CPC ........... *G05D 1/104* (2013.01); *B64C 39/024* (2013.01); *G05D 1/0061* (2013.01); *G05D 1/1064* (2019.05); *B64U 2201/102* (2023.01)

(58) Field of Classification Search
CPC .... G05D 1/104; G05D 1/0061; G05D 1/1064; B64C 39/024; B64U 2201/102
See application file for complete search history.

(56) References Cited

U.S. PATENT DOCUMENTS

| | | |
|---|---|---|
| 4,933,882 A | 6/1990 | Molnar |
| 5,521,817 A | 5/1996 | Burdoin et al. |
| | (Continued) | |

FOREIGN PATENT DOCUMENTS

| | | | |
|---|---|---|---|
| DE | 102015118030 A1 * | 4/2017 | |
| DE | 102016103704 | 9/2017 | |
| WO | WO-0065373 A2 * | 11/2000 | ......... G01S 13/9303 |

OTHER PUBLICATIONS

DE-102015118030-A1, English Translation, (Year: 2017).*

(Continued)

*Primary Examiner* — Rodney A Butler (74) *Attorney, Agent, or Firm* — The Small Patent Law Group LLC; Joseph M. Butscher (57) ABSTRACT

An aircraft and method of operating an aircraft include a flight formation control unit configured to automatically transition the aircraft into an automatic flight formation mode in response to the aircraft being within one or both of a predetermined speed or a predetermined range in relation to at least one other aircraft flying within the automatic flight formation mode. The flight formation control unit can be further configured to automatically transition the aircraft out of the automatic flight formation mode in response to detection of a control signal received from one or more flight controls of the aircraft. The flight formation control unit can be further configured to automatically cycle the aircraft and the at least one other aircraft to different positions during the automatic flight formation mode.

20 Claims, 6 Drawing Sheets

(56) References Cited

U.S. PATENT DOCUMENTS

| | | | |
|---|---|---|---|
| 7,024,309 | B2 | 4/2006 | Doane |
| 8,219,264 | B1 | 7/2012 | Blake |
| 8,949,090 | B2 | 2/2015 | Whitehead et al. |
| 10,437,261 | B2 * | 10/2019 | Sahasrabudhe .......... G05D 1/00 |
| 2005/0055143 | A1 | 3/2005 | Doane |
| 2005/0230563 | A1 * | 10/2005 | Corcoran, III ......... G05D 1/104 244/175 |
| 2017/0293307 | A1 * | 10/2017 | Frolov ................... B64D 43/02 |
| 2018/0348796 | A1 * | 12/2018 | Torralba ............... G05D 1/0825 |

OTHER PUBLICATIONS

Paranjape, Chung, Kim, and Shim, "Robotic Herding of a Flock of Birds Using an Unmanned Aerial Vehicle," IEEE Transactions on Robotics, 2018.

Wagner, Jacques, Blake, and Pachter, "Flight Test Results of Close Formation Flight for Fuel Savings," AIAA Atmospheric Flight Mechanics Conference and Exhibit, 2002.

Xu, Ning, Bower, and Kroo, "Aircraft Route Optimization for Formation Flight," Journal of Aircraft, 2014.

Buzogany, L.E, et al, "Automated Control of Aircraft in Formation Flight", AIAA Guidance, Navigation and Control Conference, 1993.

Reyna, Vincent P., "Automation of Formation Flight Control", AFIT/GE/ENG/94M-01, Dec. 27, 1993.

\* cited by examiner

AUTOMATIC FLIGHT FORMATION SYSTEMS AND METHODS

CROSS-REFERENCE TO RELATED APPLICATION

This application is a non-provisional application of U.S. Patent Application No. 63/212,765, filed Jun. 21, 2021, and the entire disclosure of which is incorporated herein by reference.

FIELD OF THE DISCLOSURE

Examples of the subject disclosure generally relate to systems and methods for automatic flight formation systems and methods for aircraft.

BACKGROUND OF THE DISCLOSURE

A plurality of aircraft can fly in formation together. For example, multiple aircraft fly in formation to increase fuel efficiency, particularly with respect to a long range flight plan. The benefits of close formation flight for fuel savings and route optimization are known. As another example, in certain tactical situations, a flight formation is used for mission effectiveness.

A known system and method provides automatic flight control once the aircraft are in a particular flight formation. However, aircraft operators typically need to manually engage a button or other such interface to enter into the automatic control within the flight formation. For example, a pilot manually presses a button within a cockpit to signal an intent to enter into an automatic flight formation mode. Similarly, if the pilot wishes to exit the automatic flight formation mode, the pilot typically presses the button or another button to signal that the aircraft is going to leave the automatic flight formation mode.

Known systems and methods for enabling and disabling automatic flight formation typically follow a standard autopilot control sequence of manually entering command information into a user interface, such as a keyboard located in a cockpit, and terminating after a second set of cockpit button presses. As can be appreciated, however, such interaction requires increased pilot workload both before and after the automatic flight formation function is operational, at a time when pilot attention should be focused on maneuvering the aircraft due to the inherent safety risks of operating in close formation. Moreover, known systems and methods for enabling automatic flight formation typically include visual cues for a pilot, which guide the pilot into a flight position within the formation, thereby further increasing task complexity and workload.

SUMMARY OF THE DISCLOSURE

A need exists for an efficient and effective system and a method for automatic flight formation. Further, a need exists for a simpler system and a method for entering into and exiting from an automatic flight formation mode. Also, a need exists for a system and a method that allow aircraft operators to more safely and easily enter into and exit from an automatic flight formation.

With at least those needs in mind, certain examples of the subject disclosure provide an aircraft including a flight formation control unit configured to automatically transition the aircraft into an automatic flight formation mode in response to the aircraft being within one or both of a predetermined speed or a predetermined range in relation to at least one other aircraft flying within the automatic flight formation mode. In at least one example, the flight formation control unit is configured to automatically transition the aircraft into the automatic flight formation mode without manual engagement of an interface related to the automatic flight formation mode.

In at least one example, the flight formation control unit is further configured to automatically transition the aircraft out of the automatic flight formation mode in response to detection of a control signal received from one or more flight controls of the aircraft. As a further example, the flight formation control unit is configured to automatically transition the aircraft out of the automatic flight formation mode without manual engagement of an interface related to the automatic flight formation mode.

In at least one example, a position sensor is configured to detect a current position of the aircraft relative to the at least one other aircraft. The flight formation control unit is in communication with the position sensor.

Flight controls are configured to allow an operator to control operation of the aircraft. The flight formation control unit is in communication with the flight controls. The flight formation control unit is configured to automatically transition the aircraft out of the automatic flight formation mode in response to the operator engaging the flight controls.

In at least one example, the flight formation control unit is further configured to automatically transition the aircraft into the automatic flight formation mode in response to detecting that an operator of the aircraft has manually held a fixed formation position within a predetermined specified range and within relative position and velocity tolerances for a minimum amount of time.

In at least one example, the flight formation control unit is further configured to automatically cycle the aircraft and the at least one other aircraft to different positions during the automatic flight formation mode. For example, the different positions include a leading position and at least one trailing position.

Certain examples of the subject disclosure provide a method including automatically transitioning, by a flight formation control unit, an aircraft into an automatic flight formation mode in response to the aircraft being within one or both of a predetermined speed or a predetermined range in relation to at least one other aircraft flying within the automatic flight formation mode.

Certain examples of the subject disclosure provide a non-transitory computer-readable storage medium comprising executable instructions that, in response to execution, cause one or more control units comprising a processor, to perform operations including automatically transitioning, by a flight formation control unit, an aircraft into an automatic flight formation mode in response to the aircraft being within one or both of a predetermined speed or a predetermined range in relation to at least one other aircraft flying within the automatic flight formation mode.

Certain examples of the subject disclosure provide an aircraft including a flight formation control unit configured to automatically cycle the aircraft and at least one other aircraft to different positions during an automatic flight formation mode.

Certain examples of the subject disclosure provide a method including automatically cycling, by a flight formation control unit, an aircraft and at least one other aircraft to different positions during an automatic flight formation mode.

Certain examples of the subject disclosure provide a non-transitory computer-readable storage medium comprising executable instructions that, in response to execution, cause one or more control units comprising a processor, to perform operations including automatically cycling, by a flight formation control unit, an aircraft and at least one other aircraft to different positions during an automatic flight formation mode.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Certain examples of the subject disclosure provide systems and methods for entering into and exiting from an automatic flight formation. The systems and methods include a flight formation control unit that is configured to automatically initiate the automatic flight formation mode for an aircraft without an aircraft operator manually engaging a button or other such interface specifically dedicated to the automatic flight formation mode. Further, the flight formation control unit is also configured to automatically cease the automatic flight formation mode for the aircraft without the aircraft operator manually engaging a button or other such interface specifically dedicated to the automatic flight formation mode.

In at least one embodiment, the automatic flight formation mode refers to a mode of flying when aircraft are automatically controlled without human intervention.

Examples of the subject disclosure provide elegant and efficient systems and methods of transferring between manual pilot/operator control and the automatic formation flight mode, such as for fuel savings. In at least one embodiment, the systems and methods are invariant to an actual fuel savings algorithm. Further, the systems and methods accommodate real-time adaptations of relative vehicle position while simultaneously providing an intuitive way to enter into and exit from the automatic flight formation.

Examples of the subject disclosure allow a pilot to simply and efficiently utilize a formation flight autopilot mode, such as may have a goal of fuel savings. The systems and methods provide mechanisms to automatically enable a formation hold mode, capture an optimal formation geometry, adjust desired formation geometry based on pilot control inputs, as well as terminate the formation hold mode.

Examples of the subject disclosure provide a seamless process for entering and exiting the automatic formation flight control mode, such as for optimal fuel burn.

Figure 1:
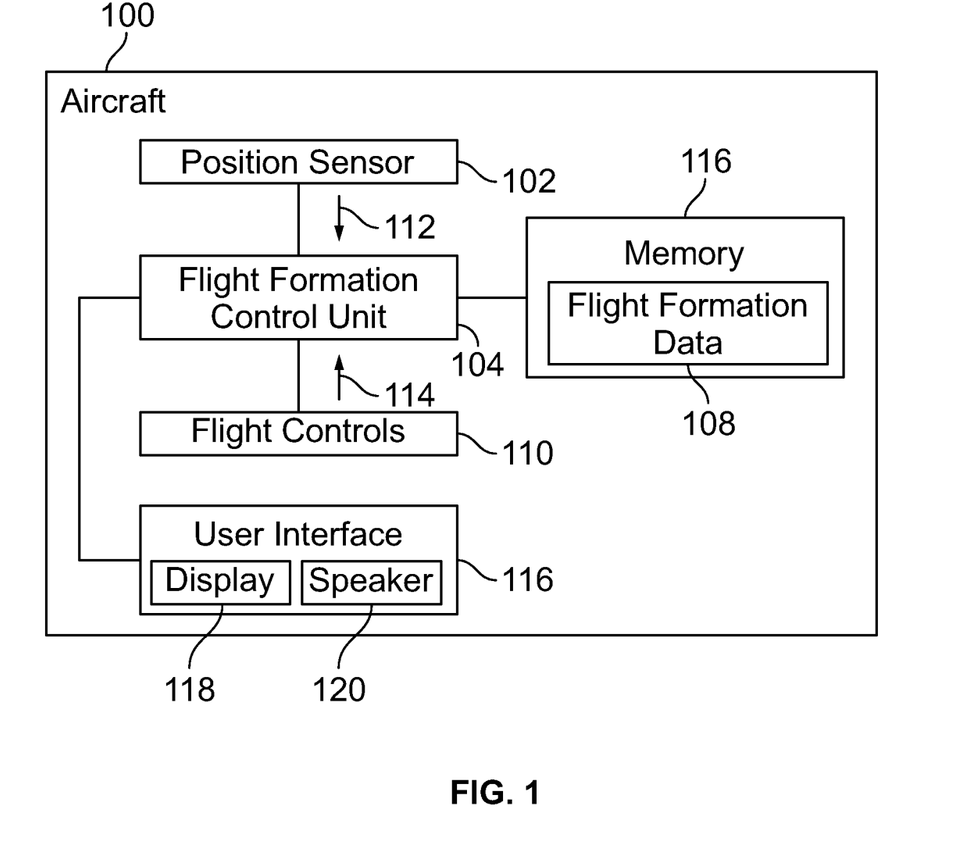
FIG. 1 illustrates a schematic block diagram of an aircraft, according to an example of the subject disclosure.

FIG. 1 illustrates a schematic block diagram of an aircraft 100, according to an example of the subject disclosure. The aircraft 100 can include wings. For example, the aircraft 100 can be a commercial or military jet. As another example, the aircraft 100 can be a helicopter. As another example, the aircraft 100 can be an unmanned aerial vehicle (UAV).

The aircraft 100 includes a position sensor 102 that is configured to detect a current position of the aircraft 100 within an airspace relative to other aircraft. For example, the position sensor 102 is a radar sensor. As another example, the position sensor 102 is an electro-optical/infrared sensor. As another example, the position sensor 102 is an ultrasonic sensor. As another example, the position sensor 102 is a light detection and ranging (LIDAR) sensor. As another example, the position sensor 102 is an automatic dependent surveillance-broadcast (ADS-B) sensor.

A flight formation control unit 104 is in communication with the position sensor 102, such as through one or more wired or wireless connections. The flight formation control unit 104 is in communication with (or otherwise includes) a memory 106, which stores flight formation data 108 having information regarding an automatic flight formation mode.

The flight formation control unit 104 is also in communication with flight controls 110, such as one or more of a flight stick, joystick, yoke, and/or the like. The flight controls 110 are operated by a pilot. That is, the pilot manually operates the flight controls 110 to control the aircraft 100.

In operation, an aircraft operator (such as a pilot) operates the aircraft via the flight controls 110. As the aircraft 100 moves proximate to a leading aircraft flying in an automatic flight formation mode, the flight formation control unit 104 automatically transitions the aircraft 100 to the automatic flight formation mode in response to the aircraft 100 operating within one or more parameters of the automatic flight formation mode. For example, the flight formation data 108 includes information regarding the automatic flight formation mode, including a particular formation (for example, a geometric shape of a plurality of aircraft within the flight formation), air speed, altitude, and relative positions of the multiple aircraft within the automatic flight formation. As the aircraft 100 moves closer to a leading aircraft within the automatic flight formation at a particular closing rate (for example, a predetermined percentage of the air speed of the automatic flight formation, such as within 2% of the air speed) and position (for example, within a predetermined distance to a position of the automatic flight formation, such as within a distance that is equal to or less than three times or less a length of the aircraft 100), the flight formation control unit 104 automatically switches the aircraft 100 into the automatic flight formation mode, which provides autopilot operation of the aircraft 100 according to the flight formation data 108. As such, the operator of the aircraft 100 need not engage a specific interface or button to transition into the automatic flight formation mode. Instead, the flight formation control unit 104 automatically transitions the aircraft 100 into the automatic flight formation mode in response to the aircraft 100 being within a predetermined distance (for example, within 3 or less lengths of the aircraft 100) and within a predetermined air speed (for example, closing in at an air speed that is within 5% or less of the air speed of the automatic flight formation) relative to at least one other aircraft currently flying in the automatic flight formation mode.

Once the flight formation control unit 104 transitions the aircraft 100 into the automatic flight formation mode, the flight formation control unit 104 automatically controls operation of the aircraft 100 according to the automatic flight formation, such as stored in the flight formation data 108. At any point, the operator can transition out of the automatic flight formation. For example, the aircraft operator can engage the flight controls 110. The flight formation control unit 104 detects the engagement of the flight controls 110, such as a difference from a detent position. If the flight controls 110 are moved past a predetermined amount (such as a movement that exceeds a certain percentage that is predetermined and preprogrammed to be beyond an inadvertent engagement), the flight formation control unit 104 transitions the aircraft 100 out of the automatic flight formation mode, and the operator is able to manually operate the aircraft 100 via the flight controls 110. Similar to the flight formation control unit 104 transitioning the aircraft 100 into the automatic flight formation mode, the operator does not engage a button, or other such interface specifically dedicated to the automatic flight formation mode in order to transition out of the automatic flight formation mode. Instead, the flight formation control unit 104 automatically transitions the aircraft 100 out of the automatic flight formation mode without manual engagement of a dedicated automatic flight formation interface.

As described herein, examples of the subject disclosure provide a system and a method for automatically transitioning the aircraft 100 into and out of an automatic flight formation mode. The flight formation control unit 104 provides the automatic transition into and out of the automatic flight formation mode. As such, an aircraft operator need not input flight formation via a cockpit keyboard or other such interfaces that would otherwise divert the attention of the operator while closing in on a leading aircraft of the flight formation. As such, examples of the subject disclosure eliminate, minimize, or otherwise reduce a risk of collision, both during initial mode setup as well as any mid-mission formation changes.

In at least one embodiment, the flight formation control unit 104 receives a position signal 112 from the position sensor 102 of the aircraft 100. The position signal 112 is indicative of the position of the aircraft 100 relative to one or more other aircraft that are currently flying in an automatic flight formation. As such, the flight formation control unit 104 monitors the relative position between the aircraft 100 and one or more other aircraft.

Additionally, the flight formation control unit 104 receives a control signal 114 from the flight controls 110. The control signal 114 is indicative of manual control of the flight controls 110.

When the flight formation control unit 104 detects from the position signal 112 and the control signal 114 that an operator of the aircraft 100 has manually held a fixed formation position within a predetermined specified range (for example, within at least one length of the aircraft 100) and within relative position and velocity tolerances for a minimum amount of time (for example, 10 seconds or less) and is only making small station keeping flight control inputs via the flight controls 110 (and as indicated from the control signal 114), the flight formation control unit 104 automatically transitions the aircraft 100 into the automatic flight formation mode, such as that aircraft 100 is automatically operated within the automatic flight formation.

In at least one example, the flight formation control unit 104 is also in communication with a user interface 116, such as may be within the cockpit or flight decks of the aircraft 100. Optionally, the user interface 116 may be remote from the aircraft 100, such as when the aircraft 100 is a UAV. The user interface 116 can include a display 118 (such as an electronic monitor) and/or a speaker 120. As a further example, the flight formation control unit 104 provides a combination of visual and/or audio feedback, via the user interface 116, to inform the operator that the aircraft 100 is flying within the automatic flight formation, and may be engaged in finding a fuel savings position and additional feedback to let the operator know that the aircraft is locked into fuel savings position.

In at least one example, the flight formation data 108 includes information regarding formation positions for the aircraft 100 and other aircraft within the automatic flight formation. Such formation positions can be specified and set if formation flight is initiated by the flight formation control unit 104. As such, the operator of the aircraft 100 only needs to move the aircraft 100 close to a desired position (such as within one length or less of the aircraft 100) of the automatic flight formation, and the flight formation control unit 104 automatically moves the aircraft into the desired position.

The formation positions are preprogrammed and stored within the flight formation data 108. The formation positions can be static or dynamically calculated, such as for a real-time adjusted optimal fuel burn formation position. When dynamic, the flight formation control unit 104 automatically adjusts the position of the aircraft 100 relative to other aircraft flying in the automatic flight formation to an optimized fuel burn formation position, for example.

In at least one example, the flight formation control unit 104 further prohibits certain formation positions which may be unsafe due to either aerodynamic interactions between the multiple aircraft or an inability to break away from formation in the event of an emergency condition. Such prohibited formation positions are defined within the flight formation data 108, for example.

In at least one example, the flight formation control unit 104 limits commands from both a formation hold mode as well as pilot inputs that could cause a flight path which could result in a mid-air collision with other aircraft in the automatic flight formation. Such information is defined within the flight formation data 108, for example. In at least one embodiment, the flight formation control unit 104 can indicate such limited commands via tactile cueing of the flight controls 110, limiting within a stability augmentation system, and/or or limiting movement of flight control surfaces.

In at least one embodiment, the flight formation control unit 104 automatically transitions the aircraft 100 out of (for example, disables) the automatic flight formation mode in response to sensing a flight path of the aircraft 100 that is significantly away from the automatic flight formation and/or sensing control signals 114 that are beyond predetermined thresholds for the automatic flight formation.

In at least one embodiment, an operator may manually disable the automatic flight formation mode, such as via one or more buttons or other such interfaces within the cockpit. Such interface(s) can be used for safety reasons and not nominal operation. The user interface 116 can provide visual and/or audio cues to inform the operator that the automatic flight formation mode has been disabled.

As described herein, the aircraft 100 includes the flight formation control unit 104, which is configured to automatically transition the aircraft 100 into an automatic flight formation mode in response to the aircraft 100 being within one or both of a predetermined speed or a predetermined range in relation to at least one other aircraft (such as a leading aircraft or other aircraft in front of the aircraft 100) flying within the automatic flight formation mode. In at least one example, the flight formation control unit 104 is further configured to automatically transition the aircraft 100 out of the automatic flight formation mode in response to detection of a control signal 114 received from one or more flight controls 110 of the aircraft 100. In at least one example, the flight formation control unit is configured to automatically transition the aircraft into (and/or out of) the automatic flight formation mode without manual engagement of an interface related to the automatic flight formation mode. For example, an operator need to press a button or other such interface to transition the aircraft into and/or out of the automatic flight formation mode.

Figure 2:
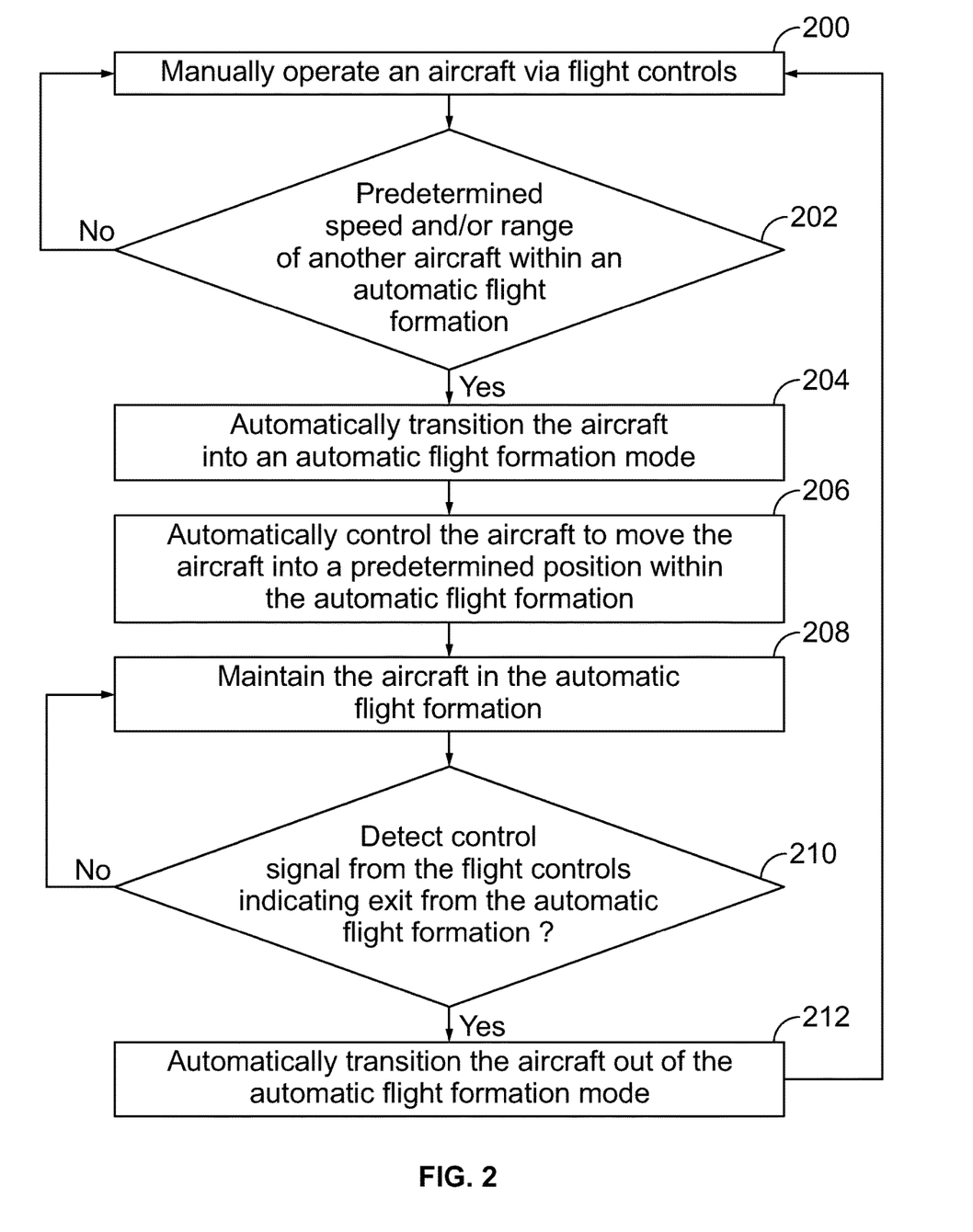
FIG. 2 illustrates a flow chart of a method of operating an aircraft, according to an example of the subject disclosure.

FIG. 2 illustrates a flow chart of a method of operating an aircraft, according to an example of the subject disclosure. Referring to FIGS. 1 and 2, at 200, an aircraft operator (for example, a pilot) manually operates the aircraft 100 via the flight controls 110. At 202, the flight formation control unit 104 determines if the aircraft 100 is within a predetermined speed and/or range of another aircraft that is currently flying within an automatic flight formation. If not, the method returns to 200.

If, however, the flight formation control unit 104 determines that the aircraft is within the predetermined speed and/or range of another aircraft that is currently flying within the automatic flight formation, the method proceeds to 204, at which the flight formation control unit 104 automatically transitions the aircraft into the automatic flight formation mode. At 206, the flight formation control unit 104 then automatically controls the aircraft 100 to move into a predetermined position within the automatic flight formation (such as defined within the flight formation data 108). At 208, the flight formation control unit 104 maintains (for example, continues to operate the aircraft to hold) the aircraft 100 in the automatic flight formation.

At 210, the flight formation control unit 104 determines if a control signal 114 from the flight controls 110 indicating an exit from the automatic flight formation is detected. If not, the method returns to 208.

If, however, the flight formation control unit 104 detects such a control signal at 210, the method proceeds to 212, at which the flight formation control unit 104 automatically transitions the aircraft 100 out of the automatic flight formation mode. The method then returns to 200.

Figure 3:
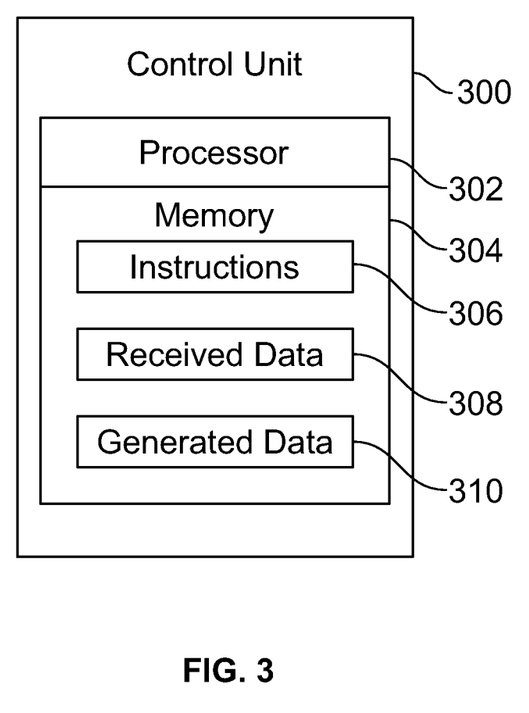
FIG. 3 illustrates a schematic block diagram of a control unit, according to an example of the subject disclosure.

FIG. 3 illustrates a schematic block diagram of a control unit 300, according to an example of the subject disclosure. In at least one example, the flight formation control unit 104 (shown in FIG. 1) is configured as shown in FIG. 3. In at least one example, the control unit 300 includes at least one processor 302 in communication with a memory 304 (for example, the memory 106 shown in FIG. 1). The memory 304 stores instructions 306, received data 308, and generated data 310. The control unit 300 shown in FIG. 3 is merely exemplary, and non-limiting.

As used herein, the term "control unit," "central processing unit," "unit," "CPU," "computer," or the like can include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the flight formation control unit 104 can be or include one or more processors that are configured to control operation thereof, as described herein.

The control unit(s), such as the flight formation control unit 104, are configured to execute a set of instructions that are stored in one or more data storage units or elements (such as one or more memories), in order to process data. For example, the flight formation control unit 104 can include or be coupled to one or more memories. The data storage units can also store data or other information as desired or needed. The data storage units can be in the form of an information source or a physical memory element within a processing machine. The one or more data storage units or elements can comprise volatile memory or nonvolatile memory, or can include both volatile and nonvolatile memory. As an example, the nonvolatile memory can comprise read only memory (ROM), programmable ROM (PROM), electrically programmable ROM (EPROM), electrically erasable PROM (EEPROM), and/or flash memory and volatile memory can include random access memory (RAM), which can act as external cache memory. The data stores of the disclosed systems and methods is intended to comprise, without being limited to, these and any other suitable types of memory.

The set of instructions can include various commands that instruct the control unit(s), such as the flight formation control unit 104, as a processing machine to perform specific operations such as the methods and processes of the various examples of the subject matter described herein. The set of instructions can be in the form of a software program. The software can be in various forms such as system software or application software. Further, the software can be in the form of a collection of separate programs, a program subset within a larger program or a portion of a program. The software can also include modular programming in the form of object-oriented programming. The processing of input data by the processing machine can be in response to user commands, or in response to results of previous processing, or in response to a request made by another processing machine.

The diagrams of examples herein can illustrate one or more control or processing units, such as the flight formation control unit 104. It is to be understood that the processing or control units can represent circuits, circuitry, or portions thereof that can be implemented as hardware with associated instructions (e.g., software stored on a tangible and non-transitory computer readable storage medium, such as a computer hard drive, ROM, RAM, or the like) that perform the operations described herein. The hardware can include state machine circuitry hardwired to perform the functions described herein. Optionally, the hardware can include electronic circuits that include and/or are connected to one or more logic-based devices, such as microprocessors, processors, controllers, or the like. Optionally, the control unit(s), such as the flight formation control unit 104, can represent processing circuitry such as one or more of a field programmable gate array (FPGA), application specific integrated circuit (ASIC), microprocessor(s), and/or the like. The circuits in various examples can be configured to execute one or more algorithms to perform functions described herein. The one or more algorithms can include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 4:
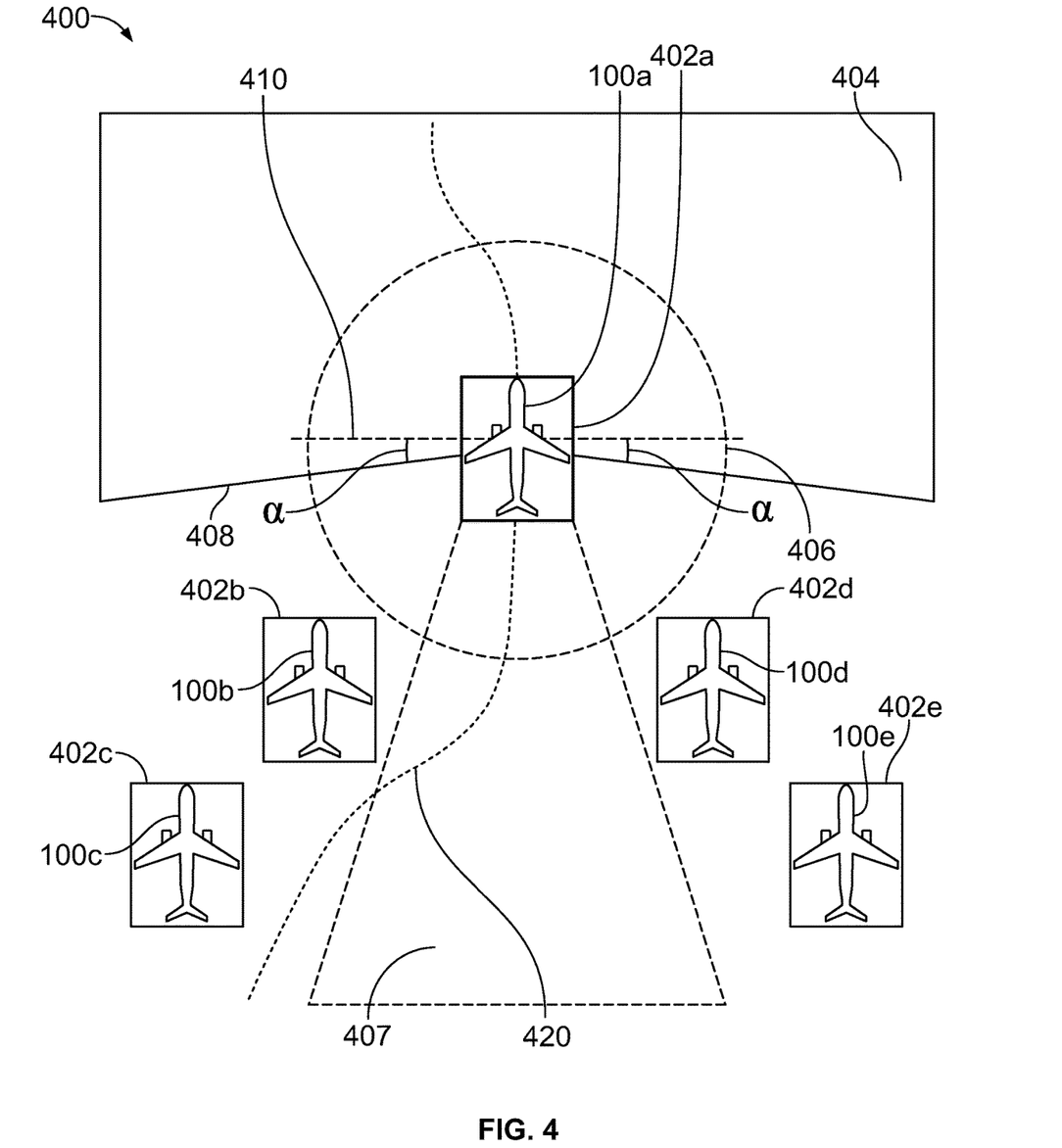
FIG. 4 illustrates a plan view of an automatic flight formation, according to an example of the subject disclosure.

FIG. 4 illustrates a plan view of an automatic flight formation 400, according to an example of the subject disclosure. The automatic flight formation 400 includes a leading aircraft 100a within a lead position 402a, and trailing aircraft 100b, 100c, 100d, and 100e within respective trailing positions 402b, 402c, 402d, and 402e. The automatic flight formation 400 can include more or less aircraft than shown. For example, the automatic flight formation 400 can include the leading aircraft 100a, and the trailing aircraft 100b and 100c. As another example, the automatic flight formation 400 can include trailing aircraft behind the trailing aircraft 100c and/or 100e.

Referring to FIGS. 1 and 4, in at least one example, the automatic flight formation 400 includes the various trailing positions 402b-e, which are optimized for fuel efficiency. The flight formation data 108 defines the leading position 402a, the trailing positions 402b-e, a dis-allowed zone 404, a minimum separation 406 between the aircraft 100a-e, and a wake turbulence zone 407.

The dis-allowed zone 404 is a space relative to the leading aircraft 100a in which aircraft that are to be within the automatic flight formation 400 are not allowed to fly. The dis-allowed zone 404 includes space in front of and abreast of (for example, at same leading level) the leading position 402a. The dis-allowed zone 404 can include a boundary 408 that is at an angle α in relation a lateral axis 410 of the leading aircraft 100a. As an example, the angle α can be 20 degrees or less. The dis-allowed zone 404 includes the boundary 408 and the space in front of the boundary 408.

The minimum separation 406 can be defined by a length of the aircraft 100a. For example, the minimum separation 406 can be at least twice the length of the aircraft 100a. As another example, the minimum separation 406 can be at least twice a diameter of a rotor, if the aircraft 100a-e include helicopters.

The trailing positions 402b-e are outside of the wake turbulence zone 407 of the leading aircraft 100a. Further, the trailing positions 402c and 402e are outside of wake turbulence zones of the trailing aircraft 100b and 100d, respectively.

The leading aircraft 100a flies over a flight path 420. The flight formation control unit 104 maintains the automatic flight formation 400 (for example, the relative positions of the various aircraft 100a-e) as the leading aircraft 100a flies over the flight path 420.

Figure 5:
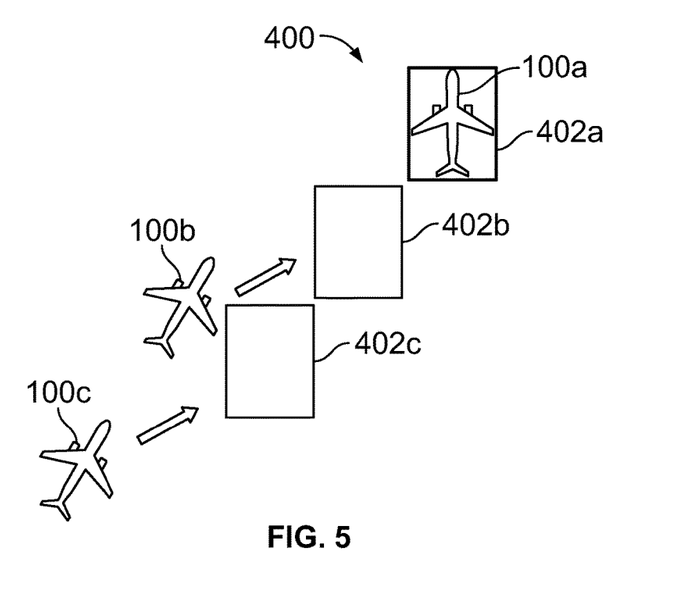
FIG. 5 illustrates a plan view of trailing aircraft moving toward trailing positions behind a leading aircraft flying within an automatic flight formation, according to an example of the subject disclosure.

FIG. 5 illustrates a plan view of trailing aircraft 100b and 100c moving toward trailing positions 402b and 402c, respectively, behind a leading aircraft 100a flying within an automatic flight formation 400, according to an example of the subject disclosure. Referring to FIGS. 1-5, the flight formation control units 104 of the trailing aircraft 100b and 100c automatically transition the aircraft 100b and 100c into the automatic flight formation mode, as described herein. The aircraft 100a-c are in communication with one another. For example, each of the aircraft 100 includes a respective flight formation control unit 104. The flight formation control units 104 of the aircraft 100a-c are in communication with one another.

Figure 6:
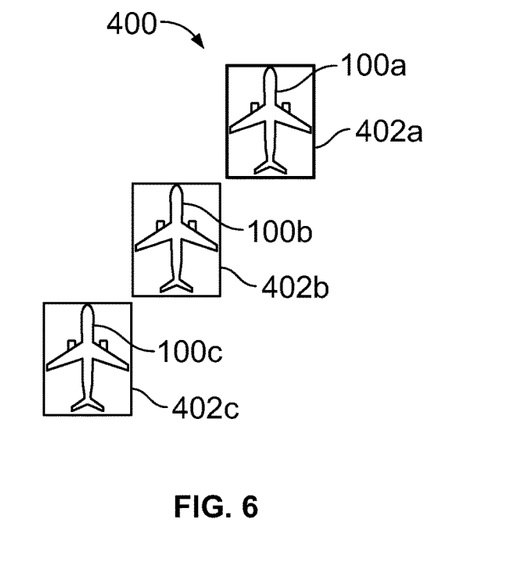
FIG. 6 illustrates a plan view of the trailing aircraft flying in the automatic flight formation behind the leading aircraft, according to an example of the subject disclosure.

FIG. 6 illustrates a plan view of the trailing aircraft 100b and 100c flying in the automatic flight formation 400 behind the leading aircraft 100a, according to an example of the subject disclosure. Referring to FIGS. 1-6, once the aircraft 100a-c are in the automatic flight formation 400, the flight formation control units 104 of the leading aircraft 100a and the trailing aircraft 100b and 100c maintain the aircraft 100a-c in their respective positions 402a-c, as described herein. The automatic flight formation 400 can include more or less aircraft than shown.

Figure 7:
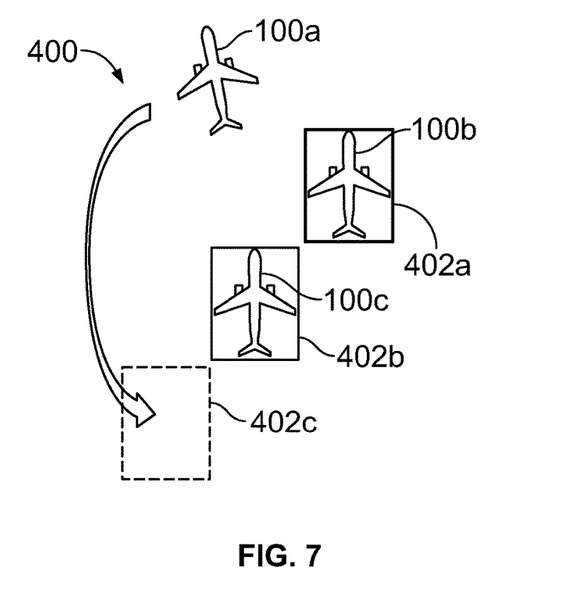
FIG. 7 illustrates a plan view of the aircraft cycling to different positions, according to an example of the subject disclosure.

FIG. 7 illustrates a plan view of the aircraft 100a-c cycling to different positions, according to an example of the subject disclosure. Referring to FIGS. 1-7, in order to increase fuel efficiency for each of the aircraft 100a-c, the flight formation control unit 104 of at least one of the aircraft 100a-c periodically changes the positions of the aircraft 100a-c within the automatic flight formation 400. For example, after a predetermined period of time of flight within the flight formation 400 (for example, such as every 5, 10, 15, etc. minutes), the flight formation control unit(s) 104 automatically operate the aircraft 100a-c to: (a) move the aircraft 100a out of the leading position 402a and back to the trailing position 402c, (b) move the aircraft 100b from the trailing position 402b into the leading position 402a, (c) move the aircraft 100c from the trailing position 402c into the trailing position 402b, and so on. For example, after another predetermined time period elapses, the flight formation control unit(s) 104 automatically move the aircraft 100c out of the trailing position 402b into the leading position 402a, and so on. In at least one example, the flight formation control unit(s) 104 periodically cycle the aircraft 100a-c to different positions within the automatic flight formation 400 so that each of the aircraft 100a-c burn a similar amount of fuel. In contrast, if the same aircraft were to always remain at the leading position, such aircraft would burn considerably more fuel than the aircraft trailing behind.

As such, in at least one example, the flight formation control unit(s) 104 of the aircraft 100a-c automatically cycle the different aircraft 100a-c to different position in order to increase fuel efficiency and fuel savings for all of the aircraft 100a-c within the automatic flight formation 400. In this manner, the range of the entire automatic flight formation 400 can be extended.

In at least one example, the flight formation data 108 defines the automatic cycling of the aircraft 100a-c within the automatic flight formation 400. For example, the automatic flight formation 400 can automatically cycle the aircraft 100a-c without any user input. In at least one other example, the cycling can occur in response to user input via the user interface 116. For example, the flight formation control unit 104 of one or more of the aircraft 100a-c can prompt an operator as to whether such cycling is to occur.

Figure 8:
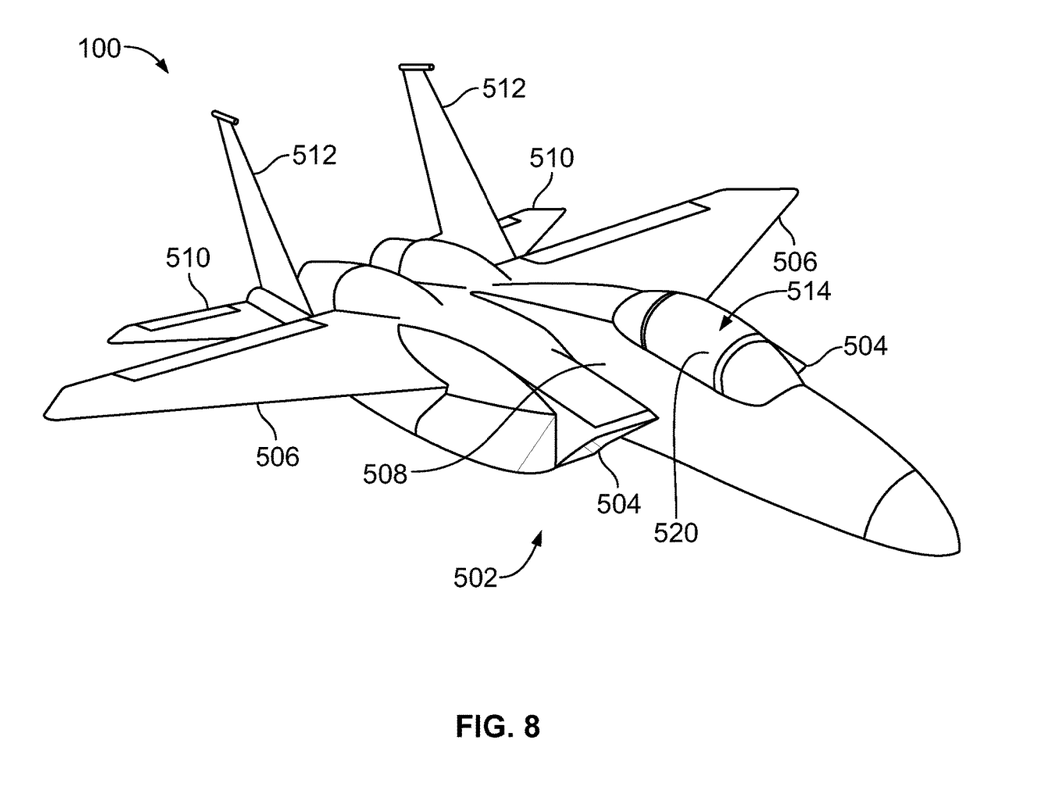
FIG. 8 illustrates a perspective front view of an aircraft, according to an example of the subject disclosure.

FIG. 8 illustrates a perspective front view of an aircraft 100, according to an example of the subject disclosure. As shown, the aircraft 100 can be a military fighter jet. The aircraft 100 includes a propulsion system 502 that includes two engines 504, for example. Optionally, the propulsion system 502 may include more or less engines 504 than shown. The engines 504 are carried by wings 506 and/or a fuselage 508 of the aircraft 100. In other embodiments, the engines 504 may be carried by other portions of the aircraft 100. The fuselage 508 also supports horizontal stabilizers 510 and vertical stabilizers 512. The fuselage 508 of the aircraft 100 includes a cockpit 514 covered by a canopy 520. Optionally, the aircraft 100 may be various other types of military aircraft, which may or may not include wings. For example, the aircraft 100 may be a helicopter. Alternatively, the aircraft may be various types of commercial aircraft, such as commercial jets, helicopters, or the like. As another example, the aircraft 100 can be an unmanned aerial vehicle (UAV).

Further, the disclosure comprises examples according to the following clauses:

Clause 1. An aircraft comprising:
  a flight formation control unit configured to automatically transition the aircraft into an automatic flight formation mode in response to the aircraft being within one or both of a predetermined speed or a predetermined range in relation to at least one other aircraft flying within the automatic flight formation mode.

Clause 2. The aircraft of Clause 1, wherein the flight formation control unit is configured to automatically transition the aircraft into the automatic flight formation mode without manual engagement of an interface related to the automatic flight formation mode.

Clause 3. The aircraft of Clauses 1 or 2, wherein the flight formation control unit is further configured to automatically transition the aircraft out of the automatic flight formation mode in response to detection of a control signal received from one or more flight controls of the aircraft.

Clause 4. The aircraft of Clause 3, wherein the flight formation control unit is configured to automatically transition the aircraft out of the automatic flight formation mode without manual engagement of an interface related to the automatic flight formation mode.

Clause 5. The aircraft of any of Clauses 1-4, further comprising a position sensor configured to detect a current position of the aircraft relative to the at least one other aircraft, wherein the flight formation control unit is in communication with the position sensor.

Clause 6. The aircraft of any of Clauses 1-5, further comprising flight controls configured to allow an operator to control operation of the aircraft, wherein the flight formation control unit is in communication with the flight controls, and wherein the flight formation control unit is configured to automatically transition the aircraft out of the automatic flight formation mode in response to the operator engaging the flight controls.

Clause 7. The aircraft of any of Clauses 1-6, wherein the flight formation control unit is further configured to automatically transition the aircraft into the automatic flight formation mode in response to detecting that an operator of the aircraft has manually held a fixed formation position within a predetermined specified range and within relative position and velocity tolerances for a minimum amount of time.

Clause 8. The aircraft of any of Clauses 1-7, wherein the flight formation control unit is further configured to automatically cycle the aircraft and the at least one other aircraft to different positions during the automatic flight formation mode.

Clause 9. The aircraft of Clause 8, wherein the different positions include a leading position and at least one trailing position.

Clause 10. A method comprising:
  automatically transitioning, by a flight formation control unit, an aircraft into an automatic flight formation mode in response to the aircraft being within one or both of a predetermined speed or a predetermined range in relation to at least one other aircraft flying within the automatic flight formation mode.

Clause 11. The method of Clause 10, wherein said automatically transitioning occurs without manual engagement of an interface related to the automatic flight formation mode.

Clause 12. The method of Clauses 10 or 11, further comprising automatically transitioning, by the flight formation control unit, the aircraft out of the automatic flight formation mode in response to detection of a control signal received from one or more flight controls of the aircraft.

Clause 13. The method of Clause 12, wherein the flight formation control unit automatically transitions the aircraft out of the automatic flight formation mode without manual engagement of an interface related to the automatic flight formation mode.

Clause 14. The method of any of Clauses 10-13, further comprising detecting, by a position sensor, a current position of the aircraft relative to the at least one other aircraft, wherein the flight formation control unit is in communication with the position sensor.

Clause 15. The method of any of Clauses 10-14, further comprising automatically transitioning, by the flight formation control unit, the aircraft out of the automatic flight formation mode in response to an operator engaging flight controls of the aircraft.

Clause 16. The method of any of Clauses 10-15, wherein said automatically transitioning comprises automatically transitioning the aircraft into the automatic flight formation mode in response to detecting that an operator of the aircraft has manually held a fixed formation position within a predetermined specified range and within relative position and velocity tolerances for a minimum amount of time.

Clause 17. The method of any of Clauses 10-16, further comprising automatically cycling, by the flight formation control unit, the aircraft and the at least one other aircraft to different positions during the automatic flight formation mode.

Clause 18. The method of Clause 17, wherein the different positions include a leading position and at least one trailing position.

Clause 19. A non-transitory computer-readable storage medium comprising executable instructions that, in response to execution, cause one or more control units comprising a processor, to perform operations comprising:
  automatically transitioning, by a flight formation control unit, an aircraft into an automatic flight formation mode in response to the aircraft being within one or both of a predetermined speed or a predetermined range in relation to at least one other aircraft flying within the automatic flight formation mode.

Clause 20. The non-transitory computer-readable storage medium of claim 19, further comprising automatically transitioning, by the flight formation control unit, the aircraft out of the automatic flight formation mode in response to detection of a control signal received from one or more flight controls of the aircraft.

Clause 21. The non-transitory computer-readable storage medium of Clauses 19 or 20, further comprising automatically cycling, by the flight formation control unit, the aircraft and the at least one other aircraft to different positions during the automatic flight formation mode.

Clause 22. An aircraft comprising:
a flight formation control unit configured to automatically cycle the aircraft and at least one other aircraft to different positions during an automatic flight formation mode.

Clause 23. The aircraft of Clause 22, wherein the different positions include a leading position and at least one trailing position.

Clause 24. A method comprising:
automatically cycling, by a flight formation control unit, an aircraft and at least one other aircraft to different positions during an automatic flight formation mode.

25. The method of Clause 24, wherein the different positions include a leading position and at least one trailing position.

26. A non-transitory computer-readable storage medium comprising executable instructions that, in response to execution, cause one or more control units comprising a processor, to perform operations comprising:
automatically cycling, by a flight formation control unit, an aircraft and at least one other aircraft to different positions during an automatic flight formation mode.

As described herein, examples of the subject disclosure provide efficient and effective systems and methods for automatic flight formation. Further, examples of the subject disclosure provide simpler systems and methods for entering into and exiting from an automatic flight formation. Also, examples of the subject disclosure provide systems and methods that allow aircraft operators to more safely and easily enter into and exit from an automatic flight formation.

While various spatial and directional terms, such as top, bottom, lower, mid, lateral, horizontal, vertical, front and the like can be used to describe examples of the subject disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An aircraft comprising:
a flight formation control unit configured to:
automatically transition the aircraft into an automatic flight formation mode in response to the aircraft being within a predetermined speed and a predetermined range in relation to at least one other aircraft flying within the automatic flight formation mode; and
automatically transition the aircraft into the automatic flight formation mode in response to detecting that an operator of the aircraft has manually held a fixed formation position within a predetermined specified range and within relative position and velocity tolerances for a minimum amount of time.

2. The aircraft of claim 1, wherein the flight formation control unit is configured to automatically transition the aircraft into the automatic flight formation mode without manual engagement of an interface related to the automatic flight formation mode.

3. The aircraft of claim 1, wherein the flight formation control unit is further configured to automatically transition the aircraft out of the automatic flight formation mode in response to detection of a control signal received from one or more flight controls of the aircraft.

4. The aircraft of claim 3, wherein the flight formation control unit is configured to automatically transition the aircraft out of the automatic flight formation mode without manual engagement of an interface related to the automatic flight formation mode.

5. The aircraft of claim 1, further comprising a position sensor configured to detect a current position of the aircraft relative to the at least one other aircraft, wherein the flight formation control unit is in communication with the position sensor.

6. The aircraft of claim 1, further comprising flight controls configured to allow an operator to control operation of the aircraft, wherein the flight formation control unit is in communication with the flight controls, and wherein the flight formation control unit is configured to automatically transition the aircraft out of the automatic flight formation mode in response to the operator engaging the flight controls.

7. The aircraft of claim 1, wherein the flight formation control unit is further configured to automatically cycle the aircraft and the at least one other aircraft to different positions after one or more predetermined periods of time within the automatic flight formation mode so that the aircraft and the at least one other aircraft burn a similar amount of fuel.

8. The aircraft of claim 7, wherein the different positions include a leading position and at least one trailing position.

9. A method comprising:
automatically transitioning, by a flight formation control unit, an aircraft into an automatic flight formation mode in response to the aircraft being within a predetermined speed and a predetermined range in relation to at least one other aircraft flying within the automatic flight formation mode,
wherein said automatically transitioning comprises automatically transitioning the aircraft into the automatic flight formation mode in response to detecting that an operator of the aircraft has manually held a fixed formation position within a predetermined specified range and within relative position and velocity tolerances for a minimum amount of time.

10. The method of claim 9, wherein said automatically transitioning occurs without manual engagement of an interface related to the automatic flight formation mode.

11. The method of claim 9, further comprising automatically transitioning, by the flight formation control unit, the aircraft out of the automatic flight formation mode in response to detection of a control signal received from one or more flight controls of the aircraft.

12. The method of claim 11, wherein the flight formation control unit automatically transitions the aircraft out of the automatic flight formation mode without manual engagement of an interface related to the automatic flight formation mode.

13. The method of claim 9, further comprising detecting, by a position sensor, a current position of the aircraft relative to the at least one other aircraft, wherein the flight formation control unit is in communication with the position sensor.

14. The method of claim 9, further comprising automatically transitioning, by the flight formation control unit, the aircraft out of the automatic flight formation mode in response to an operator engaging flight controls of the aircraft.

15. The method of claim 9, further comprising automatically cycling, by the flight formation control unit, the aircraft and the at least one other aircraft to different positions after one or more predetermined periods of time within the automatic flight formation mode so that the aircraft and the at least one other aircraft burn a similar amount of fuel.

16. The method of claim 15, wherein the different positions include a leading position and at least one trailing position.

17. An aircraft comprising:
a flight formation control unit configured to automatically cycle the aircraft and at least one other aircraft to different positions after one or more predetermined periods of time within an automatic flight formation mode so that the aircraft and the at least one other aircraft burn a similar amount of fuel.

18. The aircraft of claim 17, wherein the different positions include a leading position and at least one trailing position.

19. An aircraft comprising:
a flight formation control unit configured to:
automatically transition the aircraft into an automatic flight formation mode in response to the aircraft being within a predetermined speed and a predetermined range in relation to at least one other aircraft flying within the automatic flight formation mode; and
automatically cycle the aircraft and the at least one other aircraft to different positions after one or more predetermined periods of time within the automatic flight formation mode so that the aircraft and the at least one other aircraft burn a similar amount of fuel.

20. A method comprising:
automatically transitioning, by a flight formation control unit, an aircraft into an automatic flight formation mode in response to the aircraft being within a predetermined speed and a predetermined range in relation to at least one other aircraft flying within the automatic flight formation mode; and
automatically cycling, by the flight formation control unit, the aircraft and the at least one other aircraft to different positions after one or more predetermined periods of time within the automatic flight formation mode so that the aircraft and the at least one other aircraft burn a similar amount of fuel.

* * * * *